Aug. 6, 1940. H. H. RODIN 2,210,007
UNIVERSAL AUTOMATIC HITCH
Filed Sept. 20, 1938
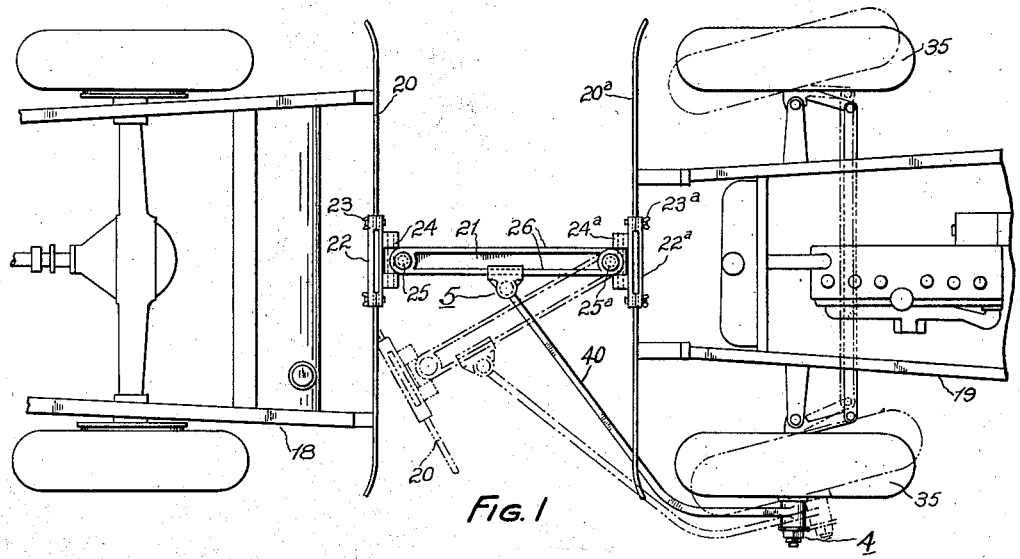
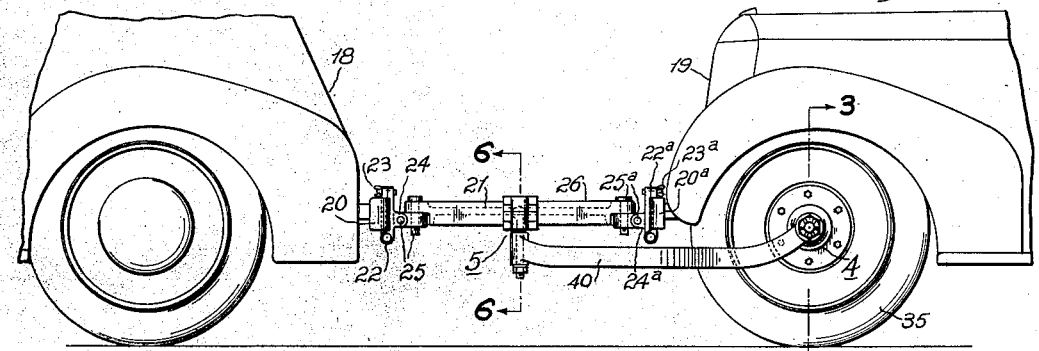
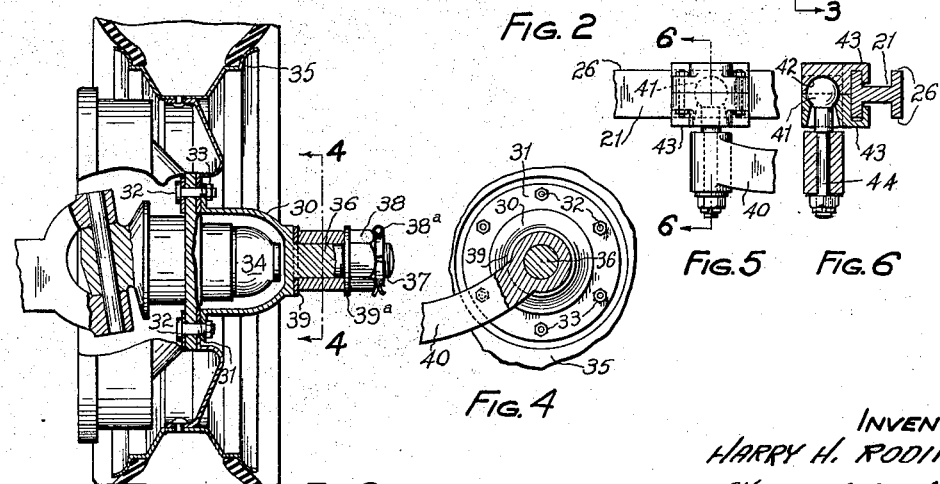
WITNESS:
Harry Orner
INVENTOR:
HARRY H. RODIN
BY Morton S Brakman
ATTORNEY.

Patented Aug. 6, 1940

2,210,007

UNITED STATES PATENT OFFICE 2,210,007

UNIVERSAL AUTOMATIC HITCH

Harry H. Rodin, Cleveland, Ohio, assignor of one-half to August Jeney, Jr., Cleveland, Ohio Application September 20, 1938, Serial No. 230,805

2 Claims. (Cl. 280—33.55)

This invention relates to towing devices and particularly to the type which couples two vehicles together in a manner which automatically co-ordinates the steering of the car being towed with that of the forward or towing car.

The primary object of the invention is to provide a device which permits one person to safely and conveniently drive an automobile to which is hitched in tandem a trailer or other vehicle. Such devices being generally known as one-man tow-bars.

Another object is to provide a tow-bar of this type which is universal in its application; that is, one which will fit, attach to, or accommodate numerous and various makes, models and designs of automobiles without the necessity of interjecting, engaging or applying special fittings or other attachments now required to couple the vehicles with the prior art devices.

A further object is to provide a device of the type mentioned which is simply, quickly, cleanly and easily installed without the use of special tools, jacks or other equipment and which may be safely attached by persons generally unskilled or unfamiliar with specific automobile chassis structure.

A still further object is to provide a device which permits a high degree of co-ordination between the vehicles so as to eliminate stress and strain between the vehicles and unnecessary wear of the coupler parts or of the vehicles themselves and which cannot harm, damage or injure in any way either the towing car or the car being towed.

Still another object is to construct a device of this nature economically out of standard and easily made parts which is sturdy, durable, compact and portable, and which is practical and safe in operation.

These and other features of the invention are more fully set forth hereinafter, reference being made to the accompanying drawing in which like parts are designated by like reference characters, and in which:

Figure 1 is a plan view of the universal automatic hitch connecting two automobiles in tandem and also showing the temporary positions of various parts while the vehicles are making a turn;

Figure 2 is a side view of the Figure 1;

Figure 3 is a sectional view of a front wheel of a towed car using the device taken along the lines 3—3 of the Figure 2;

Figure 4 is a side elevation of the wheel attachment taken along the lines 4—4 of the Figure 3;

Figure 5 is an enlarged view of the ball-joint connecting the draw-bar and the steering arm; and Figure 6 is a sectional view of the ball-joint taken along the lines 6—6 of the Figure 5.

The instant invention broadly consists of a draw-bar member which connects the vehicles 18 and 19 together in tandem; a wheel attachment, mountable on the exterior surface of the front wheel and a steering means of the draw-bar connected to and operated by the tow link.

The tongue or draw-bar member consists of a small I beam or bar 21 about six feet long and positioned so that its flanges 26 are vertical. A cross section of the beam 21 resembles the letter H. Both ends of the beam 21 are provided with vertically extending holes suitable for swivelly engaging the two clamp members which are attached to the frames of the towing and the towed vehicles 18 and 19.

The draw-bar clamp members consist of two simple hinged brackets 22 and 22a which may be quickly and easily attached or detached to the bumpers 20 and 20a by means of the bolts and wing-nuts 23 and 23a and which are linked to the beam 21 in the swivel mounts 24 and 24a by the pins 25 and 25a. The connection between the beam 21 and the two clamp members are substantially conventional universal joints, which permit the beam 21 to have free vertical, horizontal or diagonal movement with relation to the rear bumper 20 of the towing car 18 and the front bumper 20a of the towed car 19.

The wheel attachment illustrated in the Figures 3 and 4 consists of a cone or cup 30 together with its flange 31 and spindle portion 36. The flange 31 which is drilled to receive the bolts 32 extends around the lip of the cup 30. This flange 31 permits the cup 30 to be fastened to the outer side of the wheel 35 over and around the projecting hub and the bolts 32. The bolts 32 and nuts 33 are now found on most automobiles and are used to retain the removable wheel and tire 35 to the permanent hub 34.

The wheel attachment spindle 36 has a threaded end 37 to which a castle nut 38 may be locked. Two washers 39 and 39a are placed around the unthreaded portion of the spindle 36 to improve the connection to it of the steering means hereinafter described in greater detail. The wheel attachment when mounted on a wheel as indicated in the Figures 3 and 4, is actually an auxiliary projecting hub cap on which there is an axial spindle.

The preferred form of automatic steering means consists of a curved arm 40 which has a lateral hole at one end to freely engage the spindle 36 of the wheel attachment. The opposite end of the arm, the portion that curves inward of the wheel 35 and which extends between the vehicles 18 and 19 is equipped with a ball-joint slide member.

In the Figures 5 and 6 there are clearly shown the details of the ball-joint slide member. Here there is illustrated the ball 41 having a depending pintle 44 securely fastened in vertical position to the arm 40 and retained by the socket 42 in the channel member 43. The channel member 43 is composed of upper and lower matched sections firmly bolted together and engaging one of the flanges 26 of the draw-bar beam 21. The channel member 43 is free to slide smoothly and easily along the beam 21 and transmits the lateral motion of the draw-bar to the front wheels 35 of the rear vehicle 19, so that the rear vehicle is automatically steered in substantially the same path as the towing car 18 is proceeding in. This is more clearly shown in Figure 1 of the drawing.

To install and use the tow-link just described, the user first removes the ornamental hub cap on a front wheel of the rear car and attaches the cup 30 to the outer side of the wheel using the same bolts 32 and nuts 33 that are now on the car to hold the wheel 35 in place; secondly, engages the hole in the arm 40 with the spindle 36 and swivelly connects it thereto with the washers 39 and 39a, the castle nut 38 and the cotter pin 38a; and thirdly, aligns the wheels 35 of the towed vehicle 19 with the rear wheels of the towing vehicle 18 and attaches the tow-link to the bumpers 20 and 20a so that the clamp brackets 22 and 22a are in line and so that the ball-joint slide member is mid-way between the said clamp members 22 and 22a. The front vehicle may then be driven and the rear vehicle will be safely towed without any other control or attachment. Inasmuch as automobiles vary as much as five inches in the distance between their lateral wheels the draw-bar beam 21 and the brackets 22 and 22a may not always be in the exact centers of the bumpers 20 and 20a. If the vehicle 19, the one being towed, is extremely wide the draw-bar will have to shift sidewise about two and one-half inches or be that much to the left of the longitudinal center, in order to start with the wheels in line and with the ball-joint slide member mid-way between the clamp members 22 and 22a.

In the tow-link described all the stress and strain is on the draw-bar clamps 22 and 22a and beam 21. No tension whatever is ever put on the steering arm or wheel attachments except that pressure necessary for directing the front wheels of the vehicle 19. Therefore the steering arm 40 guides and steers only without doing any of the towing and without tending to throw the wheels 35 out of proper alignment or unnecessarily wearing the tires thereon.

The bumper members 20 and 20a being springy and resilient in themselves are ideally suited for mounting the draw-bar. Not only are they readily and easily accessible, but they also absorb the inertia and force shocks which generally accompanies the starting and stopping of linked vehicles.

As conducive to a clearer understanding of the purposes and operation of the device and its advantages over the prior art, it may be well to point out that, heretofore, if an automobile mechanic received an order to tow a car to the garage for repairs it was necessary, if just an ordinary tow link was employed, to have a second person steer the car being towed. This was not always convenient. Furthermore, even if extra help was available and the control of the second car was not a particular problem, the repair man, unless he knew the exact make, style and model of the automobile to be towed, would have to take with him dozens of different fittings and attachments so as to have one suitable for the particular car to be towed in. Bearing in mind that the front chassis assembly and construction of the automobiles now in use vary almost without number, general towing was quite a problem because all of the earlier automatic towing devices connected to the front axle or under-frame of the car to be towed. Making the connection to the frame, was a somewhat dirty job because of the mud and grease that ordinarily accumulates there. It was also a time consuming job because the car usually had to be raised or jacked up in order to reach the proper frame parts to make the connection.

The present invention provides for a simple and clean connection to exterior automobile parts which are easily reached and which parts are universal or substantially alike on all makes, styles or models of automobiles.

Furthermore, it should be noted that if the steering mechanisms of the two vehicles traveling in direct line operate simultaneously, they immediately get out of line. The vehicles then begin to travel in different arcs which eventually cross each other. Therefore, if the two vehicles are linked in line upon making a turn, one vehicle naturally would have to drag the other vehicle out of its path. To overcome this drag the towed vehicle, if it is equipped with an automatic steering device, would have to have a delayed-time mechanism which does permit the second or towed car to be steered until it actually reaches the point in the path where the first car began to turn.

As none of the automatic steering devices embody a delayed-steering mechanism it becomes essential that the amount of drag thus caused be restricted to a minimum, so that no unnecessary abrupt or violent wear or strain is put either on the vehicles themselves or on the towing equipment. In the instant invention, to minimize the drag referred to the arm 40 is linked to the tongue 21 or draw-bar in such manner that the front wheels 35 of the towed vehicle 19 are turned in the direction of travel approximately one-half of the number of degrees that the tongue 21 is simultaneously turned in the same direction.

The sliding linkage between the arm 40 and the tongue 21 causes the wheel 35 to deviate or turn proportionately less on a sharp turn than on a more gradual turn. This relatively smaller deviation of the towed wheels compensates for the difference between the points at which the two sets of steering wheels begin to turn, and therefore the wheels of the rear vehicle more closely follow in the tracks of the front vehicle. This feature while not so material for towing old cars relatively short distances, such as to a garage for repairs, is very important when the device is used for towing brand new cars from the factory to distant cities, as is now so frequently done.

For ordinary towing on regular highways or through city streets, seldom if ever, are the vehicles required to turn a corner of less then 90°; and consequently it is possible to make such turn, without the arc of the curve made by automotive vehicles by such turn being more than 30° away from the tangent or line of travel, and without the necessity of even temporarily driving on the wrong side of the street. The alternate positions of the draw-bar 21 and wheels 35 shown in the Figure 1 indicate the approximate relative positions of the parts when a corner of 90° is about to be or is being turned.

The resulting effect of the differential linkage referred to is that when the towing car steering wheels are turned 30° from their former line of travel, the steering wheels of the towed car at about the same time deviate approximately 15° in the same general direction. The circle of the curve which the towed car 19 tends to make is about twice the diameter of the circle of the curve which the front or towing car tends to make. Further, because of the fact that the centers around which each of the vehicles arcurately curve are not the same; but because the center of the larger circle is to the rear of the center of the smaller circle, the arcs will cross at a point half way around the segment of the arc made when both vehicles turn a corner of 90°; with the result that the towed vehicle is dragged to the left or outwardly for half of the distance around the corner and to the right for approximately the other half of the distance around the corner. However, at no point in the paths do the vehicles diverge more than 15° and then only for a limited period. Consequently the strain on the towing mechanism and on the tires and vehicles themselves are substantially forward or in the line of travel at all times.

While the drawing shows the preferred form of the invention and also while specific terms and language have been used to describe it, it is to be understood that there are other forms which will suggest themselves to persons making, using or selling automobiles and motor equipment and those modifications as well as the modifications of the illustrated form are all considered to be within the broad scope of the invention, as it is to be understood that no limitations are intended except those imposed by the scope of the appended claims.

I claim:

1. A steering device for towing vehicles, including a bar having upper and lower longitudinal flanges, and having means for connection with the towed vehicle and the towing vehicle, a one-piece member of generally L-shape, formed to have its short arm disposed over the outer side of the front wheel of the towed vehicle, means to attach said short arm of the L-member to the front wheel of the towed vehicle, sliding means on the bar, and means to pivotally connect the longer arm of the L-member to the sliding means, said connecting means consisting of sections, formed to interengage with the flanges of the bar, a pintle having a rounded end received in complementary socket portions provided therefor in the sections and movably connected to the opposite end of the L-member, and means to rigidly secure the sections of the sliding means together.

2. A steering device for towing vehicles in accordance with claim 1, wherein the means to attach the short arm of the L-member to the axle of the front wheel of the towed vehicle is composed of a cup-shaped member, formed to fit over the outer end of the axle of the front wheel of the towed vehicle, and having a flange formed to receive the bolts which secure the wheel to the hub of the axle thereby to rigidly secure the cup-shaped member to the wheel, wherein the cup-shaped member has a spindle provided with a threaded outer end, wherein the short arm of the L-member has an opening to receive the spindle, and wherein there is a nut threaded on the spindle to hold the arm on the spindle.

HARRY H. RODIN.